United States Patent
Chiu et al.

(10) Patent No.: US 7,643,097 B2
(45) Date of Patent: Jan. 5, 2010

(54) MULTIPLE-TV DISPLAY CHANNEL SETTING METHOD AND MODULE

(75) Inventors: Chaucer Chiu, Taipei (TW); Lily Fang, Taipei (TW)

(73) Assignee: Inventec Corporation, Taipei (TW)

( * ) Notice: Subject to any disclaimer, the term of this patent is extended or adjusted under 35 U.S.C. 154(b) by 826 days.

(21) Appl. No.: 11/394,703

(22) Filed: Mar. 31, 2006

(65) Prior Publication Data
US 2007/0236614 A1 Oct. 11, 2007

(51) Int. Cl.
*H04N 5/44* (2006.01)
(52) U.S. Cl. .................... 348/725; 348/734
(58) Field of Classification Search ............... 348/725, 348/734, 728, 553, 383, 21, 731–733; 725/78, 725/74, 81, 85; *H04N 5/44, 5/50, 9/12, 5/38*
See application file for complete search history.

(56) References Cited

U.S. PATENT DOCUMENTS 5,673,089 A * 9/1997 Yuen et al. ............... 725/38
5,903,259 A * 5/1999 Brusky et al. ............... 348/734
7,344,084 B2 * 3/2008 DaCosta ................... 348/734

* cited by examiner

Primary Examiner—Sherrie Hsia
(74) Attorney, Agent, or Firm—Peter F. Corless; Steven M. Jensen; Edwards Angell Palmer & Dodge LLP

(57) ABSTRACT

A multiple-TV display channel setting method for synchronously a setting mapping relation between display channels and transmission channels to a first TV and a second TV is disclosed. The method includes setting the mapping relation between the display channels and the transmission channels to the first TV, allowing the first TV to display audio/video (A/V) signals transmitted over one of the transmission channels according to one of the display channels, wherein the display channel is mapped by the mapping relation onto the transmission channel; and transmitting the mapping relation to the second TV so that the second TV displays the A/V signals transmitted over the transmission channel according to the mapped display channels.

12 Claims, 4 Drawing Sheets

| DC | display channel (Units: MHz) |
|----|------------------------------|
| 09 | 391~399 |
| 10 | 399~407 |
| 11 | 407~415 |
| 12 | 415~423 |

FIG. 3

MULTIPLE-TV DISPLAY CHANNEL SETTING METHOD AND MODULE

BACKGROUND OF THE INVENTION

1. Field of the Invention

The present invention relates to TV display channel setting techniques, and, more particularly, to a multiple-TV display channel setting method and module for setting mapping relations between display channels and transmission channels of a plurality of TVs synchronously.

2. Description of Related Arts

These days, it is quite common for many TVs to be used in the same home or facility. In general, display channels of a TV are set by a remote control. For example, by pressing one or more of a plurality of keys on a remote control, a user can select the viewing channel of the TV as desired.

In a modern TV display system, a TV is designed to display audio/video (A/V) signals transmitted over as many as tens or hundreds of transmission channels, each of which corresponds to a display channel. A TV display system typically provides an automatic channel discovery and memory function for automatically setting up the display channels for convenient access. However, such a function cannot categorize the display channels according to attributes of those display channels. For example, the channel discovery function cannot categorize news channels, movie channels, and sport channels into a series of consecutively numbered or accessible display channels.

Therefore, a user of the TV still has to set the display channels manually one-by-one if the TV provides the functionality to reorder the channels as desired. As described above, a modern family can own more than one TV per household, so, although setting one TV is burdensome enough, setting multiple TVs is quite tedious. Moreover, these TVs may have a different order of display channels due to a different setting order caused by either user-inconsistency in setting the channels or by differences in the TVs.

SUMMARY OF THE INVENTION

In view of the above-mentioned problem of the prior art, it is a primary objective of the present invention to provide a multiple-TV display channel setting method and module to synchronously set the display channels of a plurality of TVs.

To achieve the above-mentioned and other objectives, a multiple-TV display channel setting method is provided according to the present invention. The multiple-TV display channel setting method is used for synchronously a setting mapping relation between display channels and transmission channels to a first TV and a second TV. The method includes setting the mapping relation between the display channels and the transmission channels to the first TV, allowing the first TV to display audio/video (A/V) signals transmitted over one of the transmission channels according to one of the display channels, wherein the display channel is mapped by the mapping relation onto the transmission channel; and transmitting the mapping relation to the second TV so that the second TV displays the A/V signals transmitted over the transmission channel according to the mapped display channel According to the preferred embodiment, the method further includes having a remote control generate wireless signals to set the mapping relation, and having a first receiver of the first TV receive the wireless signals. The first TV includes a display unit and an on screed display (OSD) module for displaying the wireless signals generated by the remote control on the display unit. Moreover, the method further includes having a first transmitter of the first TV transmit the mapping relation to the second TV, and having a second receiver of the second TV receive the mapping relation transmitted by the first transmitter of the first TV. The first transmitter and the second receiver respectively transmits and receives the mapping relation based on the Infrared Data Association (IrDA), Infrared Mobile Communications (IrMC), or Object Exchange (OBEX) wireless communications protocols.

The present invention further discloses a multiple-TV display channel setting module for synchronously setting a mapping relation between display channels and transmission channels to a first TV and a second TV. The module includes a first receiver installed in the first TV for receiving wireless signals for setting the mapping relation, so as to allow the first TV to display A/V signals transmitted over one of the transmission channels according to one of the display channels, wherein the one of the display channels is mapped by the mapping relation onto the one of the transmission channels; and a first transmitter installed in the first TV for wirelessly transmitting the mapping relation to the second TV.

In contrast to the prior art, the multiple-TV display channel setting method and module are capable of setting display channels of a plurality of TVs synchronously, so as to reduce the time the user has to spend to set the display channels of the TVs.

BRIEF DESCRIPTIONS OF THE DRAWINGS

FIG. 3 is a schematic diagram of a mapping relation of the multiple-TV display channel setting system shown in FIG. 1.

DETAILED DESCRIPTIONS OF PREFERRED EMBODIMENTS

The following illustrative embodiments are provided to illustrate the disclosure of the present invention, these and other advantages and effects being understandable by those in the art after reading the disclosure of this specification. The present invention can also be performed or applied by other differing embodiments. The details of the specification may be changed on the basis of different points and applications, and numerous modifications and variations can be devised without departing from the spirit of the present invention.

Figure 1:
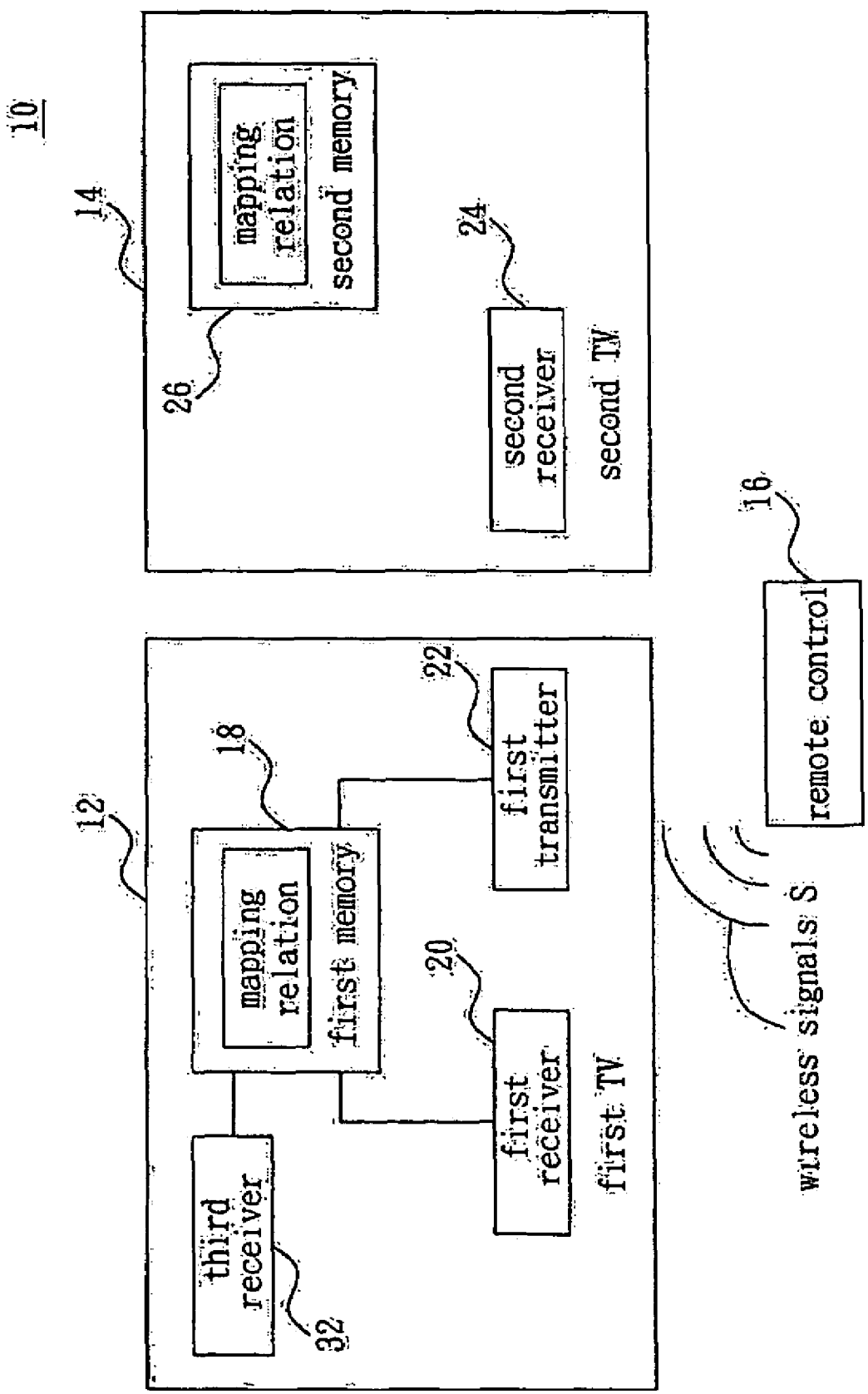
FIG. 1 is a functional block diagram of a multiple-TV display channel setting system of the preferred embodiment according to the present invention.
Figure 2:
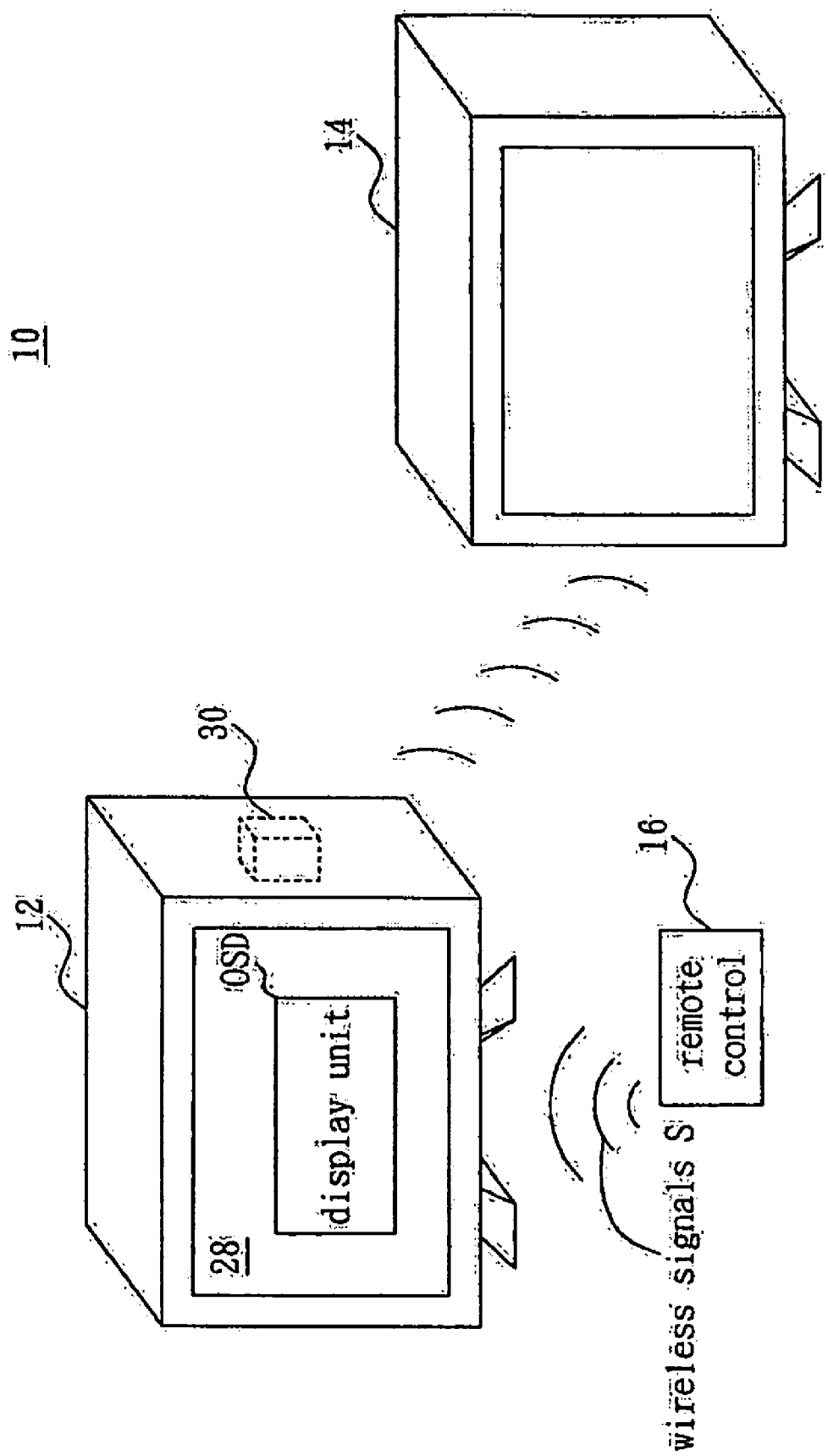
FIG. 2 is a schematic diagram of the multiple-TV display channel setting system shown in FIG. 1.

FIG. 1 is a functional block diagram of a multiple-TV display channel setting system 10 of the preferred embodiment according to the present invention. FIG. 2 is a schematic diagram of the multiple-TV display channel setting system 10. The multiple-TV display channel setting system 10 is used to synchronously set mapping relations MR between display channels DC and transmission channels TC of a plurality of TVs. For example, a first TV 12 and a second TV 14 shown in FIGS. 1 and 2. In addition to the first TV 12 and the second TV 14, the multiple-TV display channel setting system 10 further comprises a remote control 16. The first TV 12 and the second TV 14 are used to display audio/video (A/V) signals transmitted over one of the transmission channels TC according to one of the display channels DC selected by a user by pressing one or more of a plurality of keys of the remote control 16, the display channel DC being mapped by the mapping relation MR onto the transmission channel TC. The remote control 16 is used to generate wireless signals S to set the mapping relation MR. Of course, the remote control 16 can be used to generate other wireless signals to select the display channels DC. In other words, a user can both set the mapping relation MR and select display channels DC of the first TV with the same remote control 16.

FIG. 3 is a schematic diagram of the mapping relation MR. According to the mapping relation MR, the wireless signals S generated by the remote control 16 map four transmission channels (391-399 MHz), (399-407 MHz), (407-415 MHz) and (415-423 MHz) onto display channels 09, 10, 11 and 12, respectively. Therefore, when the user utilizes the remote control 16 to generate wireless signals S to select the display channel 09 of the first TV 12, A/V signals transmitted over the transmission channel (391-399 MHz) will be displayed on the first TV 12 (as display channel 09). Likewise, when the user utilizes the remote control 16 to generate wireless signals S to select the display channel 12 of the first TV 12, A/V signals transmitted over the transmission channel (415-423 MHz) will be displayed on the first TV 12.

The first TV 12 utilizes an antenna to receive the A/V signals transmitted over the transmission channels in the mapping relation MR shown in FIG. 3. However, a multiple-TV display channel setting system of the present invention may also receive A/V signals transmitted over cable TV networks.

Referring again to FIG. 1, the first TV 12 comprises a first memory 18 for storing the mapping relation MR of the first TV 12, a first receiver 20 for receiving the wireless signals S generated by the remote control 16, and a first transmitter 22 for wirelessly transmitting the mapping relation MR of the first TV 12. Accordingly, the second TV 14 comprises a second receiver 24 for receiving the mapping relation MR transmitted by the first transmitter 22 of the first TV 12, and a second memory 26 for receiving the mapping relation MR received by the second receiver 24. Therefore, a user of the multiple-TV display channel setting system 10 can synchronously set the display channels DC of the second TV 14 when setting the display channels DC of the first TV 12, without having to spend extra time to individually set the display channels of the second TV 14.

The first TV 12 further comprises a third receiver 32 similar to the second receiver 24, which is capable of receiving the mapping relation MR transmitted by the first transmitter 22. This third receiver 32 is capable of receiving another mapping relation MR transmitted by another TV. For example, if the second TV 14 also comprises a second transmitter capable of transmitting a mapping relation MR, the third receiver 32 of the first TV 12 can receive the mapping relation MR transmitted by the second transmitter of the second TV 14.

According to the preferred embodiment, the first receiver 20, the first transmitter 22, and the third receiver 32 are integrated into a multiple-TV display channel setting module, which is used to set the mapping relations between display channels and transmission channels of a plurality of TVs. Moreover, the first transmitter 22, the second receiver 24 (and the third receiver 32) are designed to transmit/receive the mapping relation MR based on the Infrared Data Association (IrDA), Infrared Mobile Communications (IrMC), and Object Exchange (OBEX) wireless communications protocols. Furthermore, the remote control 16 comprises an Infrared light emitting diode for generating the wireless signals S in the form of Infrared light. Accordingly, the first receiver 20 comprises an infrared photo sensitive diode for receiving the wireless signals S in the form of the infrared light. Lastly, the multiple-TV display channel setting system 10 (as well as the multiple-TV display channel setting module) of the present invention makes use of wireless transmission (for example infrared) to transmit the mapping relation MR of the first TV 12 to the second TV 14. However, if both of the first TV 12 and the second TV 14 are card-pluggable TVs, a multiple-TV display channel setting system of the present invention is allowed to take the form of a storage card to store the mapping relation MR of the first TV 12 to the second TV 14.

Referring to FIG. 2 again, the first TV 12 further comprises a display unit 28 and an on screen display (OSD) module 30 for displaying the wireless signals S generated by the remote control 16 on the display unit 28. In practice, the OSD module 30 displays the wireless signals S on an OSD of the display unit 28, allowing the user to conveniently set the display channels DC of the first TV 12.

Figure 4:
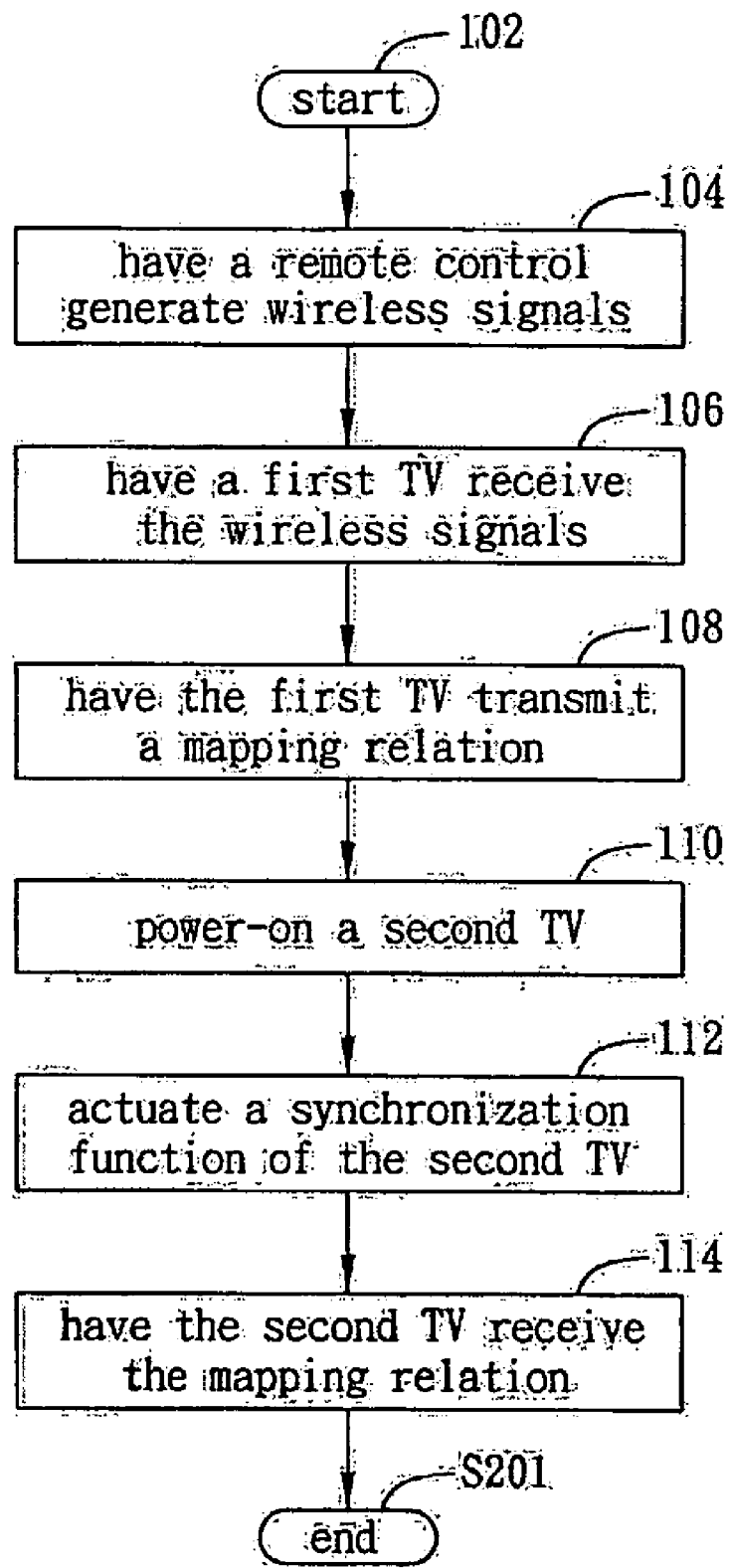
FIG. 4 is a multiple-TV display channel method corresponding to the multiple-TV display channel system shown in FIG. 1.

FIG. 4 is a flow chart of a multiple-TV display channel setting method corresponding to the multiple-TV display channel setting system 10. The multiple-TV display channel setting method starts in step 102. In step 102, the first TV 12 is powered-on, while the second TV 104 is still powered-off. Then, flow proceeds to step 104.

In step 104, the remote control 16 generates wireless signals S to set the mapping relation MR of the first TV 12. Then, flow proceeds to step 106.

In step 106, the first receiver 20 of the first TV 12 receives the wireless signals S generated by the remote control 16. At the same time, an OSD is displayed on the display unit 28 of the first TV 12. Thereby, the user can easily set the display channels DC of the first TV 12. Then, flow proceeds to step 108.

In step 108, the first transmitter 22 of the first TV 12 transmits the mapping relation MR. Then, flow proceeds to step 110.

In step 110, the second TV 14 is powered-on. Then, flow proceeds to step 112.

In step 112, a synchronization function of the second TV 14 is actuated.

Similarly, another OSD is displayed on a display unit of the second TV 14. Thereby, a user of the second TV 14 can easily actuate the synchronization function. Then, flow proceeds to step 114.

In step 114, the second receiver 24 of the second TV 14 receives the mapping relation MR transmitted by the first transmitted 22. The synchronization function further stores the mapping relation MR received by the second receiver 24 into the second memory 26. Then, flow proceeds to step S201.

In step S201, the display channels DC of the second TV have been set synchronously in accordance with the setting of the display channels DC of the first TV 12.

In contrast to the prior art, the multiple-TV display channel setting method and related module and system are capable of synchronously setting display channels of a plurality of TVs, thereby reducing the time the user has to spend to set the display channels of these TVs.

The foregoing descriptions of the detailed embodiment are illustrated to disclose the features and functions of the present invention and are not restrictive of the scope of the present invention. It should be understood by those in the art that various modifications and variations can be made to the present invention yet still fall within the spirit and principles of the present invention as described in the appended claims.

What is claimed is:

1. A multiple-TV display channel setting method for synchronously setting a mapping relation between display channels and transmission channels to a first TV and a second TV, the method comprising the steps of:

setting the mapping relation between the display channels and the transmission channels to the first TV, allowing the first TV to display audio/video (A/V) signals transmitted over one of the transmission channels according to one of the display channels, wherein the one of the display channels is mapped by the mapping relation onto the one of the transmission channels; and transmitting the mapping relation to the second TV so as to allow the second TV to display the A/V signals transmitted over the one of the transmission channels according to the mapped one of the display channels.

2. The method of claim 1 further comprising:

having a remote control device generate wireless signals for generating the mapping relation; and having a first receiver of the first TV receive the wireless signals.

3. The method of claim 2, wherein the first TV comprises a display unit and an on screen display (OSD) module for displaying the wireless signals on the display unit.

4. The method of claim 1 further comprising:

having a first transmitter of the first TV transmit the mapping relation to the second TV wirelessly; and having a second receiver of the second TV receive the mapping relation wirelessly transmitted by the first transmitter of the first TV.

5. The method of claim 4, wherein the first transmitter and the second receiver respectively transmits and receives the mapping relation based on an Infrared Data Association (IrDA) wireless communications protocol.

6. The method of claim 4, wherein the first transmitter and the second receiver respectively transmits and receives the mapping relation based on an Infrared Mobile Communications (IrMC) wireless communications protocol.

7. The method of claim 4, wherein the first transmitter and the second receiver respectively transmits and receives the mapping relation based on an Object Exchange (OBEX) wireless communications protocol.

8. A multiple-TV display channel setting module for synchronously setting a mapping relation between display channels and transmission channels to a first TV and a second TV, the module comprising:

a first receiver installed in the first TV for receiving wireless signals for setting the mapping relation, so as to allow the first TV to display A/V signals transmitted over one of the transmission channels according to one of the display channels, wherein the one of the display channels is mapped by the mapping relation onto the one of the transmission channels; and a first transmitter installed in the first TV for wirelessly transmitting the mapping relation to the second TV.

9. The module of claim 8 further comprising a third receiver installed in the first TV for receiving the mapping relation.

10. The module of claim 9, wherein the first transmitter and the third receiver respectively transmits and receives the mapping relation based an IrDA wireless communications protocol.

11. The module of claim 9, wherein the first transmitter and the third receiver respectively transmits and receives the mapping relation based on an IrMC wireless communications protocol.

12. The module of claim 9, wherein the first transmitter and the third receiver respectively transmits and receives the mapping relation based on an OBEX wireless communications protocol.

* * * * *